United States Patent [19]
Taira et al.

[11] Patent Number: 5,279,778
[45] Date of Patent: Jan. 18, 1994

[54] POSITIONING CORRECTION METHOD FOR MOTOR-OPERATED INJECTION MOLDING MACHINE

[75] Inventors: Takayuki Taira, Hachioji; Susumu Ito, Yamanashi; Masao Kamiguchi, Yamanashi; Minoru Kobayashi, Yamanashi; Ryuji Tai, Yamanashi, all of Japan

[73] Assignee: Fanuc Ltd., Minamitsuru, Japan

[21] Appl. No.: 988,108

[22] PCT Filed: Jun. 11, 1992

[86] PCT No.: PCT/JP92/00748
§ 371 Date: Jan. 20, 1993
§ 102(e) Date: Feb. 10, 1993

[87] PCT Pub. No.: WO93/00211
PCT Pub. Date: Jul. 1, 1993

[30] Foreign Application Priority Data
Jun. 28, 1991 [JP] Japan .................. 3-183978

[51] Int. Cl.$^5$ ............................ B29C 45/76
[52] U.S. Cl. .................. 264/40.1; 425/135; 425/150; 425/574; 425/592; 425/593
[58] Field of Search .......... 264/40.1, 40.5, 328.1, 264/328.11; 425/135, 150, 167, 168, 574, 589, 590, 592, 593, 451.2, 451.5, 451.6

[56] References Cited

U.S. PATENT DOCUMENTS

| | | | |
|---|---|---|---|
| 4,832,884 | 5/1989 | Speck et al. | 425/593 |
| 4,904,173 | 2/1990 | Tanaka et al. | 425/150 |
| 5,059,365 | 10/1991 | Hertzer et al. | 264/40.5 |
| 5,069,613 | 12/1991 | Inaba et al. | 425/150 |
| 5,147,659 | 9/1992 | Watanabe et al. | 425/574 |

FOREIGN PATENT DOCUMENTS

| | | |
|---|---|---|
| 60-124227 | 7/1985 | Japan . |
| 61-125829 | 6/1986 | Japan . |
| 61-220819 | 10/1986 | Japan . |
| 61-279353 | 12/1986 | Japan . |
| 62-21517 | 1/1987 | Japan . |

Primary Examiner—Jill L. Heitbrink
Attorney, Agent, or Firm—Staas & Halsey

[57] ABSTRACT

A positioning correction method for a motor-operated injection molding machine, intended to eliminate waste of power supply to or overheat of servomotors by locking up in an ideal state the motor-operated injection molding machine, which uses a toggle mechanism or crank for mold clamping and other operations. During the lockup period, a load RA acting on a mold clamping servomotor 7 is detected (S8), and a position command value PM for the servomotor 7 is increased or decreased in the next cycle in a direction such that the value of the load RA is reduced, if the value of the load RA is greater than a preset reference value V0 (S12, S13). As a result, a rotation center Q1 of a crank 2 and two opposite ends Q2 of a link 3 are locked up in a straight line, so that a moment of rotation produced by a mold clamping reaction force is removed from the rotation center Q1 of the crank 2. In this manner, the mold clamping reaction force can be maintained during the lockup period without applying a driving torque to the mold clamping servomotor 7 by energizing the same. Thus, not only the waste of power can be prevented but also the load on the mold clamping servomotor 7 can be reduced, thereby unnecessitating the use of a stopper or other means for maintaining the mold clamping reaction force.

10 Claims, 4 Drawing Sheets

MOLD OPEN STATE

NORMAL LOCKUP STATE

INSUFFICIENT-ROTATION LOCKUP STATE

OVER-ROTATION LOCKUP STATE

POSITIONING CORRECTION METHOD FOR MOTOR-OPERATED INJECTION MOLDING MACHINE

TECHNICAL FIELD

The present invention relates to a positioning method of moving/pressing means for moving and pressing a movable member of an injection molding machine against a stationary member through drive control by a servomotor.

BACKGROUND ART

Conventionally known are motor-operated injection molding machines which use servomotors for driving a mold clamping mechanism, nozzle touching mechanism, etc.

The motor-operated injection molding machines which utilize a servomotor for the mold clamping mechanism are classified broadly into two categories: a straight-hydraulic type, in which a movable platen fitted with a movable-side mold is linearly moved for mold clamping by driving a ball-nut-and-screw mechanism by means of the servomotor, and a type in which the mold clamping is effected by pushing out the movable platen by means of a link mechanism. In general, the link mechanism of the latter type may be formed of a toggle mechanism or a crank mechanism.

Referring now to the diagrams of FIGS. 4 and 5, the respective operations of mold clamping mechanisms, in which the movable platen is pressed against a stationary platen by means of the link mechanism, will be described. In FIG. 4, which illustrates the operation of a link mechanism using a crank, symbol 1a designates the crank, which is rotated around a support joint Q1 by means of a servomotor M. A driving joint Q2 of the crank 1a is connected to an action joint Q3, on the side of a movable platen mp for use as a movable member through a link 1b. When the crank 1a is rotated in the clockwise direction of FIG. 4 by driving the servomotor M in this arrangement, the movable platen mp linearly moves in the direction of the arrow of FIG. 4 (i.e., toward the stationary platen) to come into contact with the stationary platen, thereby producing a mold clamping force. Thereupon, positioning is effected by commanding the servomotor M to take a position such that the driving joint Q2 is located on a line which connects the support joint Q1 and the action joint Q3, after adjusting the position of the support joint Q1 or the like so that a set mold clamping force is produced in a state (lockup state) such that the support joint Q1, driving joint Q2, and action joint Q3 are situated substantially on a straight line, as indicated by dotted line in FIG. 4. In the state that the set mold clamping force is obtained with the support joint Q1, driving joint Q2, and action joint Q3 arranged on a straight line, as a result, the crank 1a and the link 1b receive a reaction force against the mold clamping force in the lockup state in which they are stretched to their full length and situated on a straight line, so that no rotatory force is applied to the crank 1a. Thus, no external force acts so as to rotate the servomotor.

FIG. 5 is a diagram for illustrating the operation of a mold clamping mechanism using a link mechanism of the (double) toggle type. The principle of operation of this mechanism resembles that of the one using the crank mechanism of FIG. 4.

More specifically, when a ball screw bs is driven by a servomotor M, a toggle head th, which is integral with a nut threadedly engaged with the ball screw bs, linearly moves. As this is done, the movable platen moves toward the stationary platen in a manner such that links 1a and 1b and links 1c and 1d gradually shift their respective postures from bent positions, indicated by full lines in FIG. 5, to stretched positions, indicated by dotted lines. Thereupon, the servomotor is commanded to take a position for a set mold clamping force (position such that a support joint Q1, driving joint Q2, and action joint Q3 are situated on a straight line), after adjusting the position of the support joint Q1 or the like so that the set mold clamping force is produced in a state (lockup state) such that the support joint Q1, driving joint Q2, and action joint Q3 are situated substantially on a straight line, as indicated by each dotted line in FIG. 5. In the state that the set mold clamping force is obtained in this manner, as in the case of FIG. 4, the links 1a and 1b and the links 1c and 1d receive a reaction force against the mold clamping force in the lockup state, in which the links in each set are stretched to their full length and situated on a straight line, so that no rotatory force is applied to the link 1a. Thus, no external force acts to rotate the servomotor. Although the toggle shown in FIG. 5 is of the double-toggle type, a single-toggle type is based on the same principle, so that its description will be omitted here.

Although the prior-art principle of operation in the case where the mold clamping mechanism is driven by means of the link mechanism using the crank or toggle has been described, this link mechanism is also utilized in a nozzle touching mechanism. More specifically, the link mechanism using the crank or toggle is utilized for moving an injection apparatus, as a movable member, toward a stationary mold and pressing a nozzle of the injection apparatus against the stationary platen to produce and maintain a predetermined touching force. This principle of operation of the nozzle touching mechanism is equivalent to that of an arrangement in which the movable platen mp of FIG. 4 is replaced with the injection apparatus (which is moved toward the stationary mold during nozzle touching operation) in the case of the nozzle touching mechanism using the crank mechanism, and to that of an arrangement in which the movable platen mp of FIG. 5 is replaced with the injection apparatus in the case of the nozzle touching mechanism using the toggle mechanism. Since these arrangements are based on the same principle as the ones described with reference to FIGS. 4 and 5, individually, further description thereof will be omitted here.

In performing the mold clamping or nozzle touching operation through the link mechanism using the crank or toggle, as described above, an assigned position for the servomotor is judged such that the one link (or crank) and the other are in the lockup state in which they are stretched substantially to their full length. When the delivery of the position command to the servomotor is finished, the link mechanism is locked up by being positioned in this manner, so that the force from the mold clamping mechanism acting around the axis of the servomotor can be thoroughly removed. Consequently, no load acts on the servomotor, so that only a very small driving current is needed to keep the servomotor in its rotational position. Thus, a predetermined mold clamping state or nozzle touching state can be maintained with a supply of fine current.

According to the motor-operated injection molding machine described above, however, various problems arise in the positioning control for the servomotor due to secular changes such as changes in dimensions of various parts of mechanisms or changes in friction coefficient, which are attributable to fit abrasion, deterioration of relative dimensional accuracy attributable to local temperature changes, etc.

In case of fit abrasion at part of a drive transmission section of the mold clamping mechanism which uses the toggle mechanism or crank for mold clamping, for example, the toggle mechanism or crank may sometimes fail to reach a predetermined position (position for the lockup state), or may possibly move beyond the predetermined position, even when the servomotor is controlled so as to be driven to a preset command position. In such a case, a predetermined mold clamping force or nozzle touching force cannot be obtained or maintained, so that the mold clamping mechanism or nozzle touching mechanism cannot establish and maintain a precise lockup state. Thus, in this state, a reaction force from the mold clamping mechanism or a reaction force based on the nozzle touching force acts around the axis of the servomotor, so that a driving current corresponding to the reaction force must be supplied continuously during the mold clamping period or nozzle touching period, in order to control the servomotor so that its present position is maintained. In some cases, therefore, the servomotor may overheat.

DISCLOSURE OF THE INVENTION

The object of the present invention is to provide a positioning correction method for a motor-operated injection molding machine, capable of eliminating the drawbacks of the prior art, and precisely controlling the drive of various parts of mechanisms of the motor-operated injection molding machine, regardless of various secular changes and dimensional changes.

In order to achieve the above object, according to the present invention, there is provided a motor-operated injection molding machine, which is designed so that a movable member is moved toward a stationary member to be brought into contact therewith by the drive control of a servomotor through a link mechanism, and a support joint, a driving joint, and an action joint of the link mechanism are arranged on a straight line for positioning such that a predetermined force of pressure goes on acting, and in which a load acting on the servomotor when the movement of the servomotor to an assigned position is completed is detected, and a position command for the movement of the servomotor to the assigned position for the next cycle is modified on the basis of the relationship between the value of the detected load and the value of a preset reference load so that the movable means goes on applying the predetermined force of pressure to the stationary member in the next cycle under a stabler mechanical condition than in the preceding cycle.

Preferably, the movable member is a movable platen fitted with a movable mold member or an injection apparatus, and a set mold clamping force or a nozzle touching force is produced when the support joint, driving joint and action joint of the link mechanism are arranged on a straight line. Further preferably, the link mechanism is of either a crank or toggle type, and a command position for the servomotor is a position such that the support joint, driving joint and action joint of a crank or toggle of the link mechanism are arranged on a straight line.

Further preferably, the assigned position for the next cycle is obtained by adding the product of the value of the load acting on the servomotor and a preset coefficient to the value for the assigned position for the preceding cycle, if the absolute value of the load acting on the servomotor when the movement of the servomotor to the assigned position is completed is greater than the value of the preset reference load. Alternatively, the assigned position for the next cycle is obtained by adding or subtracting a preset fixed value to or from the value for the assigned position for the preceding cycle.

Further preferably, the value of the load on the servomotor is the average of the respective values of loads sampled at a plurality of points of time in the same cycle.

According to the present invention, as described above, the load on the servomotor is detected as the movable member is pressed against the stationary member by locking up the crank or toggle by using the servomotor as a drive source, and the value of the position command for the servomotor is automatically corrected so that the detected load comes within a set range. Thus, even in the case of secular changes, such as changes in dimensions of various parts mechanisms or changes in friction coefficient, which are attributable to fit abrasion, deterioration of relative dimensional accuracy due to local temperature changes, etc., the crank or toggle can be precisely moved to a mechanically stable point, so that the lockup can be kept in an ideal state such that no external force acts on the servomotor. Thus, waste of power supply to the servomotor and overheat of the servomotor can be prevented during the lockup period, and the trouble of providing a mechanical stopper for maintaining the lockup can be eliminated.

BRIEF DESCRIPTION OF THE DRAWINGS

FIG. 3 shows diagram illustrating states of a crank machanism in the injection molding machine of the embodiment, in which

BEST MODE OF CARRYING OUT THE INVENTION

Figure 1:
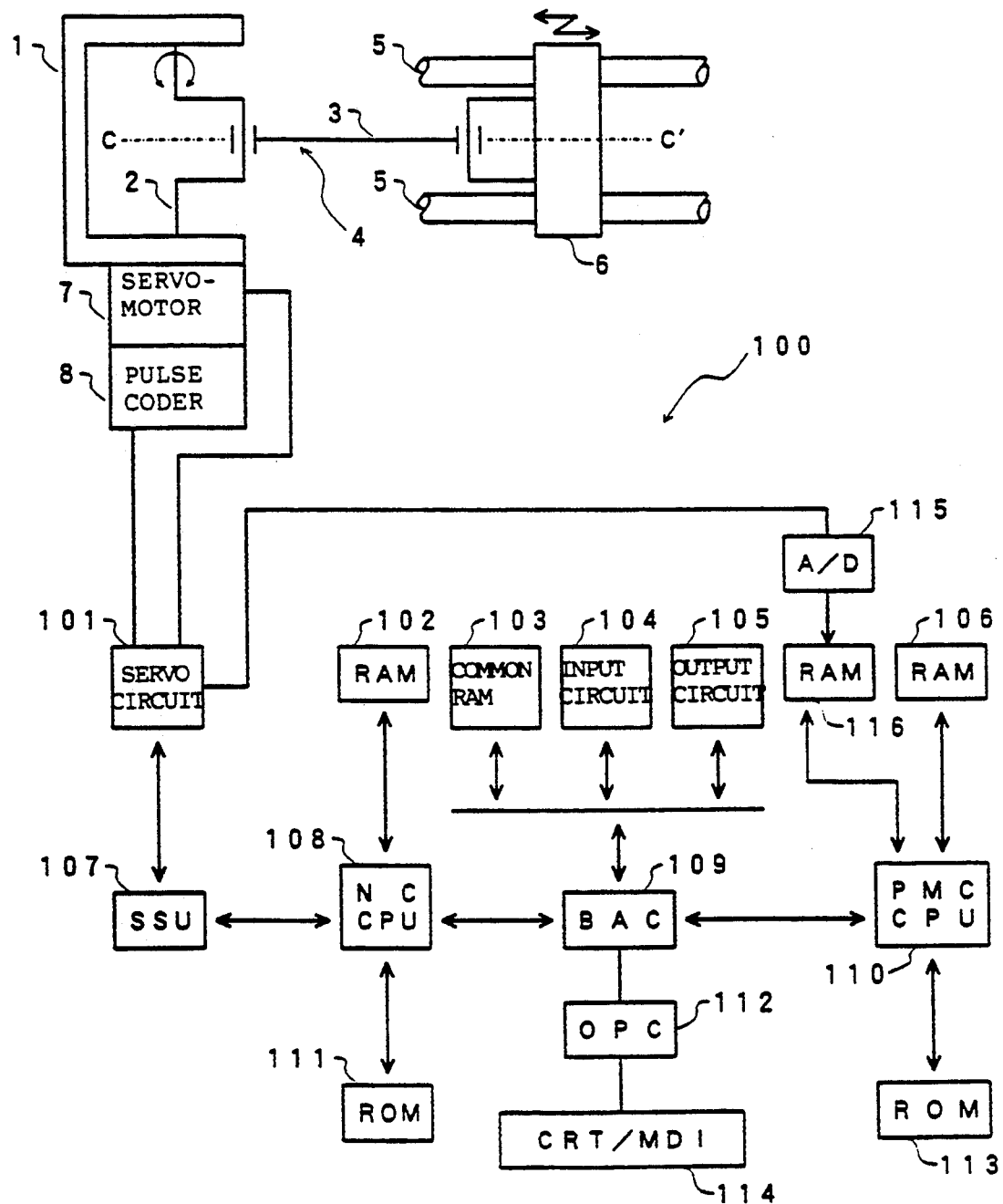
FIG. 1 is a block diagram showing the principal part of a crank-type motor-operated injection molding machine according to one embodiment for carrying out a method of the present invention.

FIG. 1 is a block diagram showing the principal part of a motor-operated injection molding machine according to one embodiment for carrying out a method of the present invention. Illustrated in this diagram is only the surroundings of a mold clamping mechanism in the crank-type injection molding machine. In FIG. 1, tie bars 5 are stretched between a rear platen 1 and a front platen, and a movable platen 6 is slidably mounted on the tie bars 5. Further, a crank 2 of a crank mechanism 4, which constitutes the mold clamping mechanism, is rotatably mounted on the rear platen 1. One end of a link 3 is pivotally mounted on a bent portion of the crank 2, while the other end of the link 3 is pivotally mounted on the reverse side (side remoter from molds) of the movable platen 6. The crank 2 is rotated by means of a servomotor 7 for mold clamping. This servomotor 7 is provided with a pulse coder 8 for detecting its rotational position and speed.

On the other hand, the motor-operated injection molding machine is controlled by means of a numerical control device 100. The numerical control device 100 comprises a microprocessor (hereinafter referred to as NCCPU) 108 for NC and a microprocessor (hereinafter referred to as PMCCPU) 110 for programmable machine controller. The PMCCPU 110 is connected to a ROM 113 stored with sequence programs for controlling the sequence operation of the injection molding machine and the like, a RAM 106 used for temporary storage of data and the like, and a RAM 116 loaded with a torque command voltage mentioned later. The NCCPU 108 is connected to a ROM 111 stored with management programs for generally controlling the injection molding machine and the like, a RAM 102 used for temporary storage of data and the like, and a servo interface 107.

The respective buses of the NCCPU 108 and the PMCCPU 110, along with the bus of a common RAM 103 and the respective buses of an input circuit 104 and an output circuit 105, are connected to a bus arbiter controller (hereinafter referred to as BAC) 109. The buses used are controlled by means of the BAC 109. The common RAM 103, which is a nonvolatile common RAM composed of a bubble memory or CMOS memory, includes a memory section for storing NC programs for controlling individual operations of the injection molding machine and the like, a set memory section for storing various set values, parameters, and macro variables associated with molding conditions and the like, etc.

The servo interface 107 is connected to servo circuits 101 which are used to control servomotors for individual axes for injection, mold clamping, screw rotation, ejector operation, etc. The servo system shown in FIG. 1 includes only the mold clamping servomotor 7 and the servo circuit 101 therefor. An output from the pulse coder 8 is applied to the input of the servo circuit 101.

Further, a manual data input device 114 with CRT (hereinafter referred to as CRT/MDI) display unit is connected to the BAC 109 through an operator panel controller 112. Various set pictures and operation menus can be displayed on a CRT display screen of the CRT/MDI 114. By operating various operation keys (soft keys, ten-keys, etc.), moreover, various set data and set pictures can be inputted and selected, respectively.

In the arrangement described above, the numerical control device 100 is designed so that the NCCPU 108 distributes pulses to the servo circuits for the individual axes of the injection molding machine through the interface 107, thereby controlling the injection molding machine, as the PMCCPU 110 performs sequence control operation in accordance with the NC programs stored in the common RAM 103, the parameters for the various molding conditions stored in the set memory section of the common RAM 103, and the sequence programs stored in the ROM 113.

The servo circuit 101 substracts pulses, which are from the pulse coder 8, from the distributed pulses received through the servo interface 107, and causes an error register to output an error quantity for the present position compared with a command position. Then, the output of the error register is D/A-converted and delivered as a speed command; this speed command is compared with the present speed obtained by F/V-converting the output of the pulse coder 8, and a current command, that is, torque command, for the mold clamping servomotor 7 is outputted. Also, the current presently flowing through the mold clamping servomotor 7 is compared with the current command delivered from a speed controller, and the current for the servomotor 7 is controlled to regulate the output torque in accordance with the result of the comparison.

Further, a torque command voltage detected in the servo circuit 101 is loaded, as a driving torque for the mold clamping servomotor 7, into the RAM 116 through an A/D converter 115 with every predetermined period. The PMCCPU 110 detects the data written in this RAM. Since the operations for position, speed, and current loop processing associated with the servomotor control are generally known, further detailed description of these operations will be omitted.

FIG. 3 shows diagrams for illustrating the respective behaviors of the crank 2 and the link 3 shown in FIG. 1 during mold clamping operation. While the direction of the axis of rotation of the crank 2 is vertical in FIG. 1, it is perpendicular to the drawing plane of FIG. 3. In FIG. 3, Q1 denotes a support joint as the axis of rotation of the crank, and the one and the other ends of the link 3 are connected to a driving joint Q2 and an action joint Q3, respectively. The dashed line of FIG. 3(a) is a straight line which, passing through the support joint Q1, represents a path of transfer of the support joint Q1.

Figure 3A:
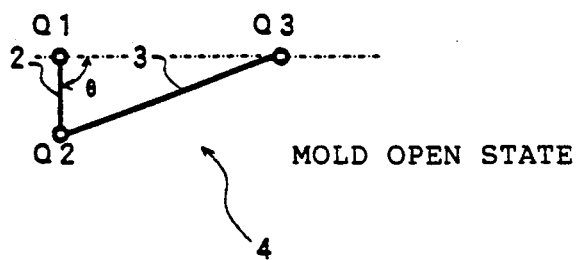
FIG. 3(a) illustrates a mold opening completion state.
Figure 3B:
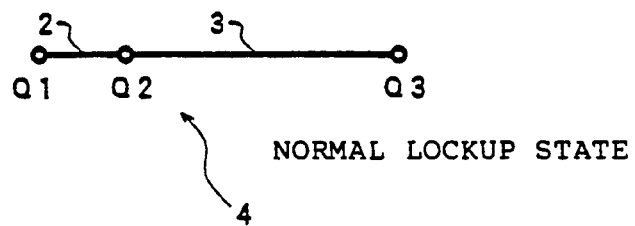
FIG. 3(b) illustrates an ideal lockup state.

FIG. 3(a) is a diagram showing a state of the crank mechanism 4 established on completion of mold opening, while FIG. 3(b) is a diagram showing a state in which the crank mechanism is locked up normally. In this lockup state, the support joint Q1, driving joint Q2, and action joint Q3 are situated on a straight line such that the link 3 is stretched (or locked up) to its full length, so that a reaction force produced by mold clamping does not act as a moment of rotation around the support joint Q1. Accordingly, no external load will be applied to the mold clamping servomotor 7.

On receiving a position command PM for a movement corresponding to a rotational angle $\theta$ of the crank 2, the mold clamping servomotor 7 rotates the crank 2 to move the operating position of each part of the crank mechanism 4 from the mold opening completion state shown in FIG. 3(a) to the lockup state shown in FIG. 3(b). The rotational angle $\theta$ of the crank 2 is set variously according to the mold opening distance, which depends on the mold configuration. Also, the position of the rear platen 1 itself and therefore the position of the center Q1 of rotation of the crank 2 vary depending on the mold thickness.

If the crank mechanism 4 is in the ideal lockup state, as shown in FIG. 3(b) when the rotation of the crank 2 based on the position command PM is finished, a reaction force against a mold clamping force, which is produced by the lockup of the crank mechanism 4 and extension of the tie bars 5, acts on the crank 2 in the direction of the dashed line of FIG. 3(a). After the lockup state is established, therefore, no external force acts on the mold clamping servomotor 7.

Figure 3C:
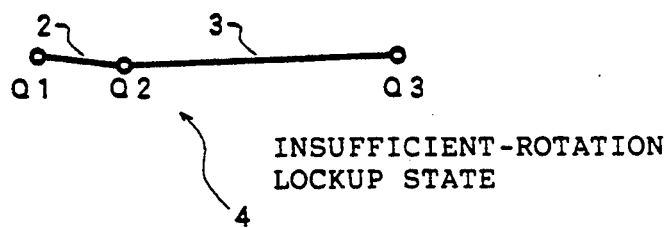
FIG. 3(c) illustrates a state such that a crank is not fully rotated.

If a speed reduction mechanism between the mold clamping servomotor 7 and the crank 2 has suffered fit abrasion or the like which is attributable to secular changes, however, this will cause backlash or the like in the speed reduction mechanism, so that the rotation of the crank 2 will be insufficient. In some cases, it can happen therefore, that the crank mechanism 4 fails to reach an ideal lockup position, as shown in FIG. 3(c), even when the mold clamping servomotor 7 itself is rotated to a commanded position corresponding to the position command PM. In other cases, however, the crank mechanism 4 may possibly go beyond the ideal lockup position, as shown in FIG. 3(d), depending on various other changes in situation, despite the normal operation of the mold clamping servomotor 7 in response to the position command PM.

Figure 3D:
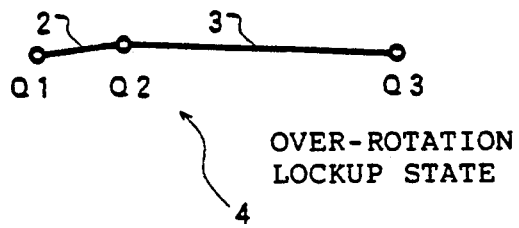
FIG. 3(d) illustrates a state such that the crank is rotated beyond the lockup state.
Figure 4:
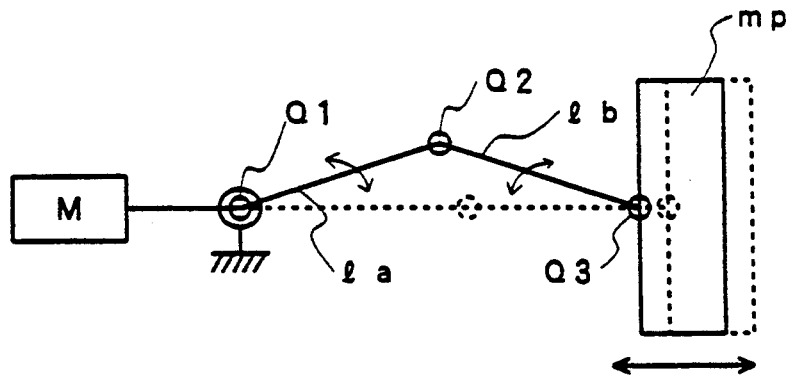
FIG. 4 is an operation principle diagram for illustrating an operation in which a movable platen is moved in a straight-line direction by means of a link mechanism using a crank, driven by means of a servomotor.
Figure 5:
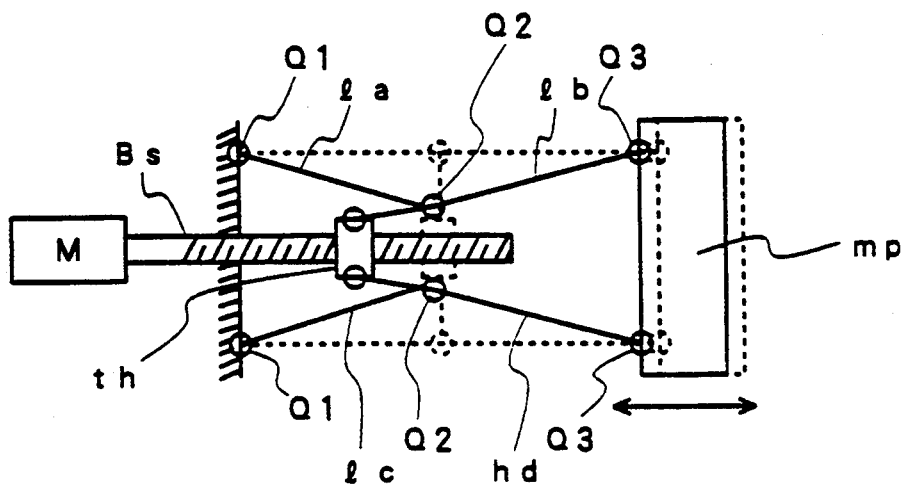
FIG. 5 is an operation principle diagram for illustrating an operation in which a movable platen is moved in a straight-line direction by means of a link mechanism using a toggle, driven by means of a servomotor.

Even when the complete lockup state is not established, as shown in FIGS. 3(c) and 3(d), however, a mold of the movable platen 6 and a mold of a stationary platen are in contact with each other to produce the mold clamping force, so that the moment of rotation produced by the mold clamping force acts in the clockwise direction around the support joint Q1 through the link 3 in the state of FIG. 3(c), and in the counterclockwise direction in the state of FIG. 3(d). Accordingly, the mold clamping servomotor 7 is urged to maintain a set mold clamping position, resisting the rotatory force thereof. That is, if the position of the servomotor 7 is deviated from the set mold clamping position due to the reaction force against the mold clamping force, thereby producing a positional deviation, the servomotor 7 is supplied with such an electric current as to reduce the positional deviation to zero. As described above, if the support joint Q1, driving joint Q2, and action joint Q3 are situated on a straight line in the ideal lockup state, as shown in FIG. 3(b), the rotatory force acting on the servomotor 7, urged by the reaction force against the mold clamping force, is substantially zero. If the lockup is not complete, that is, if the support joint Q1, driving joint Q2, and action joint are not situated on a straight line, as shown in FIGS. 3(c) and 3(d), however, the force acting on the servomotor 7 increases in proportion to the deviation from the straight line, so that the torque command and driving current for the servomotor 7 increase correspondingly.

Figure 2:
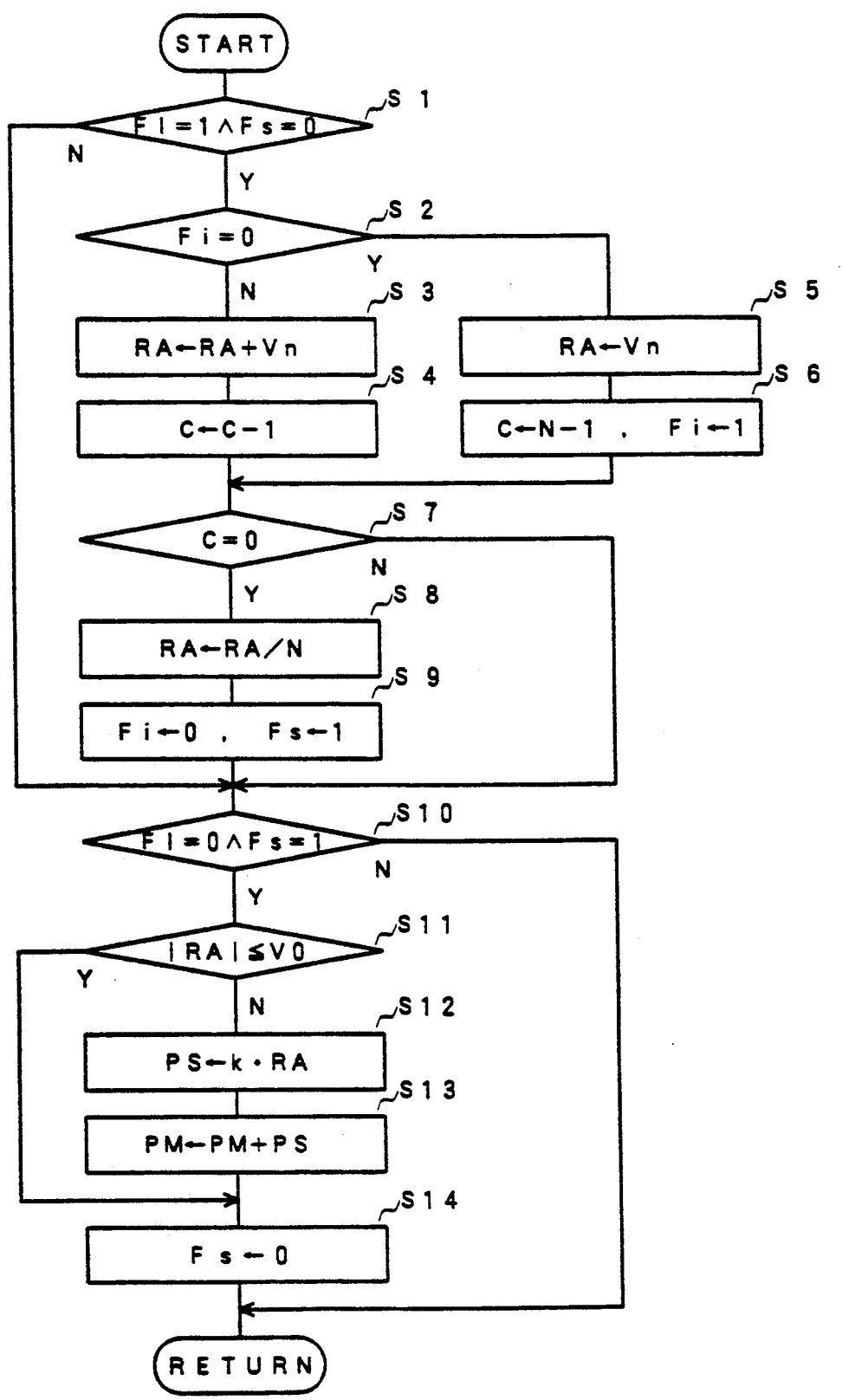
FIG. 2 is a flow chart showing an outline of a positioning correction processing executed in task processing for each predetermined period by means of a PMCCPU provided for the injection molding machine of the embodiment.

Referring now to the flow chart of FIG. 2, an outline of a positioning correction processing, executed in task processing for each predetermined period by the PMCCPU 110, will be described. The period of this positioning correction processing is set to be shorter enough than the time during which the mold clamping mechanism maintains the lockup state, and this processing is repeatedly executed a plurality of times during one lockup cycle. In the flow chart of FIG. 2, the processings of Steps S2 to S9 are processing for detecting the average of loads acting on the mold clamping servomotor 7 during one lockup period, while the processing of Steps S11 to S14 are processings for modifying the value of the position command for mold clamping.

Before executing this positioning correction processing, a sampling execution frequency N and reference load V0 are set by CRT/MDI 114, and stored beforehand.

After starting the positioning correction processing, the PMCCPU 110 first judges whether or not a flag in the common RAM 103, which is indicative of the lockup state of the crank mechanism as an object, that is, a lockup period flag Fl, is set by means of the NCCPU 108, and also whether a sampling completion flag Fs is set or not, thereby discriminating between a state that the mold clamping mechanism is presently locked up and a state that sampling is not completed (Step S1). If the lockup period flag Fl is not set, or if the sampling completion flag Fs is set, then the above-described state will not be discriminated, so that the result of judgement in Step S1 will be negative (N), and thus the PMCCPU 110 proceeds to a discrimination processing of Step S10 without executing the processings of Steps S2 to S9. Whereas, the processings of Steps S2 to S9 will be executed during the period of the aforesaid state in which the mold clamping mechanism is locked up (Fl=1), and the sampling for the load detection during the lockup state is not completed (Fs=0), since the result of judgement in Step S1 will become positive (Y).

If the result of judgement in Step S1 is negative, the PMCCPU 110 proceeds to Step S10, whereupon it further judges whether the lockup period flag Fl is set or not, and whether the sampling completion flag Fs is set or not. If the lockup period flag Fl is reset (F1=0), and if the sampling for the molding cycle concerned is not finished, the result of decision in Step S10 will be negative (N). Thereupon, the PMCCPU 110 finishes the processing for the present period without executing the processings of Steps S11 to S14. The processings of Steps S11 to S14 are executed only during an initial processing period at the start of the mold opening, as mentioned later.

Meanwhile, if a mold clamping start command is outputted in accordance with the sequence programs of the PMCCPU 110 when the crank mechanism 4 is in the mold opening completion position, as shown in FIG. 3(a), the NCCPU 108 distributes in pulses the parameter PM for mold clamping set in the common RAM 103, that is, the position command PM for the movement corresponding to the rotational angle $\theta$ of the crank 2, thereby starting the drive of the mold clamping servomotor 7 through the medium of the servo interface 107 and the servo circuit 101 to lock up the crank mechanism 4. Normally, when the position of the mold clamping servomotor 7 gets into a target-in-position range so that the lockup state is established after the pulse distribution is finished, the positional deviation associated with the mold clamping servomotor 7 is reduced to zero or a very small value approximate to zero. Further, the NCCPU 108 detects that the position of the mold clamping servomotor 7 has entered the target-in-position range, and sets the lockup period flag Fl of the common RAM 103.

Thereupon, when the PMCCPU 110 detects in the discrimination processing of Step S1 that the lockup period flag Fl is set, and that the sampling-completion flag Fs is not set, (this flag Fs is not set at the start), it then judges whether a sampling start flag Fi is set or not (Step S2). Since this flag is not set (Fi=0) at the present stage or in the initial period of the lockup state, the PMCCPU 110 executes a first sampling cycle for detecting the average value of loads acting on the mold clamping servomotor 7 during the present lockup period. More specifically, the PMCCPU 110 reads an up-to-date present value Vn of the driving torque of the mold clamping servomotor 7 from the RAM 116, stores it in a average load storage register RA (Step S5), sets a value (N−1) to be obtained by subtracting 1 from the previously set sampling execution frequency N in a sampling counter C, and further sets the sampling start flag Fi (Step S6).

Subsequently, the PMCCPU 110 judges whether the value in the sampling counter C is 0 or not, that is, whether the sampling cycles corresponding to the previously set frequency N are completed or not (Step S7). Since the present stage corresponds to a first period of processing in which the value in the counter is not 0 (C≠0), the PMCCPU 110 proceeds to Step S10 without executing the processings of Steps S8 and S9. Then, the PMCCPU 110 judges whether the lockup period flag Fl is reset or not, and whether the sampling-completion flag Fs is set or not, in the same manner as aforesaid, thereby discriminating the resetting and setting, respectively, of the lockup period flag Fl and the sampling-completion flag Fs (Step S10). At the present stage, the lockup period flag Fl is not reset (Fl≠0), and the sampling completion flag Fs is not set (Fs≠1) either, so that the PMCCPU 110 finishes the positioning correction processing for this period without executing the processings of Steps S11 to S14, and returns to the same sequence processing as the conventional one.

In the positioning correction processing for the next period, the PMCCPU 110 first detects in this stage that the lockup period flag Fl is set and that the sampling completion flag Fs is not set (Fl=1 AND Fs=0), so that the result of decision in Step S1 is positive (Y), and the PMCCPU 110 proceeds to Step S2. Thereupon, the PMCCPU 110 detects that the sampling start flag Fi is set (since the present period is not the first one), so that it reads the up-to-date present value Vn of the driving torque of the mold clamping servomotor 7 from the RAM 116, adds this data to the value in the average load storage register RA, and executes a second sampling cycle (Step S3). Further, the PMCCPU 110 decrements the value in the sampling counter C by 1 (Step S4).

Then, the PMCCPU 110 executes the discrimination processings of Steps S7 and S10 in which the result of decision is negative (N), in the same manner as aforesaid, and finishes the positioning correction processing for this period.

In individual subsequent periods, the PMCCPU 110 repeatedly executes the discrimination processings of Steps S1 and S2, sampling processing of Step S3, processing of Step S4, and discrimination processings of Steps S7 and S10, in the same manner as aforesaid.

When the PMCCPU 110 detects that the sampling processing of Step S3, including the processing of Step S5, is executed for the set frequency (N number of cycles) so that the value in the sampling counter C becomes 0 (Step S7), the cumulative value stored in the average load storage register RA is divided by the sampling frequency N to calculate the average value of the driving torques of the mold clamping servomotor 7, and the resulting value is stored in the average load storage register RA (Steps S8). The sampling start flag Fi is reset, while the sampling completion flag Fs is set (Step S9).

Then, the PMCCPU 110 discriminates between a state that the lockup period flag Fl is reset and a state that the sampling completion flag Fs is set, respectively to judge whether the lockup state and the calculation of the average value of the driving torques are finished or not (Step S10). Since the flag Fl is set (F≠0) during the lockup state, the result of judgement in Step S10 is negative (N). During the time interval in which an injection/dwell stage and cooling stage are finished, and the crank mechanism 4 is released from the lockup state (Fl=0; and Fs=1 is previously established), and thereafter, the PMCCPU 110 repeatedly executes only the discrimination processings of Steps S1 and S10.

When the crank mechanism 4 is released from the lockup state so that the lockup period flag Fl is reset (i.e., Fl=0 AND Fs=1) after the end of the injection/dwell stage and cooling stage, the result of judgement in Step S10 becomes positive (Y), whereupon the PMCCPU 110 compares the average value (absolute value) of the driving torques of the mold clamping servomotor 7, stored in the average load storage register RA, and the previously set reference load V0 (>0) (Step S11). $|RA| \leq V0$ is the basis for judging whether the average value of the driving torques stored in the register RA is between $-V0$ and $+V0$ ($-V0 \leq RA \leq +V0$) or not. If the crank mechanism 4 is locked in the ideal state, as shown in FIG. 3(b), no external force acts on the mold clamping servomotor 7 in the lockup state, so that the cumulative value and average value RA of the driving torques stored in the register RA are theoretically zero, that is, $|RA| \leq V0$ holds. In this case, the value of the parameter PM stored with the position command for mold clamping requires no correction.

In the case of FIG. 3(c) where the crank mechanism 4 cannot come close to the ideal lockup position even when the mold clamping servomotor 7 is rotated to the commanded position PM, however, the relationship between the average driving torque value and the reference load can be given by RA>V0. On the other hand, in the case of FIG. 3(d) where the ideal lockup position is overshot by the crank mechanism 4 when the mold clamping servomotor 7 is rotated to the command position PM, RA<−V0 is obtained. In these cases, the servo circuit 101 must go on delivering forward and reverse torque command currents throughout the lockup period, in order to keep the mold clamping servomotor 7 in the command position. The greater the value of the load $|RA|$ on the mold clamping servomotor 7, the higher the power consumption is.

If the PMCCPU 110 concludes in the processing of Step S11 that there is a relation $|RA|>V0$, therefore, the value in the average load storage register RA is multiplied by a proportionality factor k to calculate a correction value PS for the position command (Step S12), and the correction value PS is added to the value of the parameter PM stored with the position command for mold clamping, thereby setting a new position command value PM again (Step S13). Since this corrected position command value is delivered to the mold clamping servomotor 7 in the next molding cycle, the lockup position of the crank mechanism 4 approaches the ideal state shown in FIG. 3(b). That is, if the state before the correction is the one shown in FIG. 3(c), the value stored in the average load storage register RA exceeds the reference load V0 (RA>V0), so that the value PS (=k·RA) is positive, and the new position command value PM increases correspondingly. In the next mold clamping cycle, therefore, the movement of the crank mechanism 4 becomes larger than that of the preceding claming cycle so that the position of the mechanism 4 approaches the ideal lockup position, as shown in FIG. 3(b). On the other hand, in the case of the lockup position shown FIG. 3(d), there is the relation RA < −V0, so that the value PS (=k·RA) is negative, and the new position command value PM is reduced correspondingly. In the next mold clamping cycle, therefore, the movement of the crank mechanism 4 is reduced, so that its moved position also approaches the ideal lockup position.

In the present embodiment, the correction value PS of the position command is calculated by multiplying the value in the average load storage register RA by the proportionality factor k, so that the correction value for the position command value PM can be obtained by a single processing for correction. In executing this positioning correction processing, which is executed every time the link mechanism 4 is locked up, the processing of Step S12 may be omitted. Since the position command value PM can be either incremented or decrement by a predetermined value at a time in the processing of Step S13, in which the position of the crank mechanism 4 can be modified by a fixed distance for each mold clamping cycle so that the crank mechanism 4 can be is driven to the ideal position (i.e., position where $|RA| \leq V0$ holds). Actually, the average value RA of the driving torques non-linearly varies depending on the angular deviation of the crank 2 from the ideal lockup position, so that a coefficient which can replace the proportionality factor may be calculated on the basis of this non-linear function. However, since the positioning correction processing is a processing executed every time the link mechanism 4 is locked up, as mentioned before, the moved position of the crank mechanism 4 can gradually be modified for each mold clamping cycle so that the mechanism 4 is driven to the ideal position. Thus, the object can be fully achieved by using the simple proportionality factor.

After thus correcting the parameter value PM stored with the position command value; the PMCCPU 110 initializes the sampling completion flag Fs (Step S14), and then finishes the positioning correction processing for this period.

During the time interval from the start of mold opening following the injection/dwell stage and cooling stage to the output of the next mold clampling start signal, lookup period flag Fl is reset, and the sampling completion flag Fs is kept unset. Accordingly, the results of decision in Steps S1 and S10 are both negative (N), so that only the discrimination processings of Steps S1 and S10 are repeatedly executed, and the positioning correction processing will not be executed. When the lockup state of the crank mechanism 4 is detected, thereafter, the positioning correction processing will be repeatedly executed for each of the present and subsequent periods, in the same manner as aforesaid, whereby the lockup position of the crank mechanism 4 will be corrected according to the preceding cycle of load detection.

Thus, according to the present embodiment, even when the ideal lockup state cannot be obtained due to fit abrasion, which is attributable to secular changes, or localized temperature variation of the members, the support joint Q1, driving joint Q2, and action joint Q3 of the crank 2 of the crank mechanism 4 can be situated on a straight line to remove the mold clamping reaction force from the mold clamping servomotor 7 by gradually correcting the rotational position of the crank 2. Consequently, the mold clamping reaction force need not be maintained during the lockup period by means of the driving force of the mold clamping servomotor 7, so that not only wasteful power consumption can be prevented but also mechanical stopper means for maintaining the mold clamping reaction force need not be provided.

Although the above-described embodiment is an example of application of the present invention to the crank-type mold clamping mechanism, the present invention may be also applied to a toggle-type mold clamping mechanism driven by a servomotor. Like the crank type mentioned before, the toggle-type mold cramping mechanism is designed so that a mold clamping force is produced when a toggle is in a lockup state, that is, a state in which it is stretched to its full length. In this (ideal) state, the mold clamping force will never act as a force to bend the toggle, so that the drive of the servomotor for driving the toggle mechanism will be stopped.

If the toggle fails to be stretched to its full length for some reason when the servomotor is driven to its mold clamping command position, however, the toggle mechanism will not be able to maintain the mold clamping force under its mechanically stable condition, so that the mold clamping force acts as a force to fold the toggle in the aforesaid state. In order to overcome this mold clamping force and maintain a fixed mold clamping force, therefore, an electric current is supplied to the servomotor.

Thus, according to the present invention, the mold clamping mechanism using the toggle, like the case of the crank type according to the foregoing embodiment, is arranged so that the load on the servomotor during the mold clamping period is detected by a driving torque (torque command value), and the mold clamping command position is corrected so that the load to be detected is within a set range, whereby the toggle mechanism can maintain the mold clamping force under the mechanically stable condition.

The above-described embodiments are characterized by that the mold clamping command position of the servomotor for controlling the mold clamping mechanism is appropriately modified so that the mold clamping mechanism, using the crank mechanism or toggle mechanism, can produce the mold clamping force at its mechanically stable point. Such modification of the command position may be applied to a nozzle touching mechanism as well as to the mold clamping mechanism. That is, in moving the whole injection apparatus to a resin inlet port of the mold by means of moving/pressing means, which corresponds to the crank mechanism or toggle mechanism, so that the apparatus is brought into contact with the port, in order to inject a material into the clamped mold, (the theoretical command value of) a position command to be delivered to a servomotor for controlling the drive of the moving/pressing means is appropriately modified into a value such that the moving means can actually maintain a nozzle touching state under the mechanically stable condition. Thus, according to this arrangement when the whole injection apparatus is in the nozzle touching state, the servomotor need not be supplied with any special current for maintaining this state. More specifically, as in the case of the foregoing embodiments, the load on the servomotor during the touching period (lockup period) is detected, and the position to be judged by the servomotor during the touching period is corrected so that this load is within a set range.

Although the analog servo circuit is taken as an example of a circuit for controlling the drive of the servomotor according to the foregoing embodiments, a digital servo circuit, in which a microprocessor executes processings equally to the analog servo circuit, may alternatively be used. In this case, a torque command for the servomotor is handled as a digital value as it is calculated in the digital servo circuit and outputted, so that the calculated torque command can be read by the PMCCPU 110 through the servo interface 107, NCCPU 108, and common RAM 103.

Moreover, according to the foregoing embodiments, the load on the servomotor is detected by the torque command (current command) delivered to the servomotor. Alternatively, however, the load on the servomotor may be detected by directly detecting the current flowing through the servomotor.

We claim:

1. A positioning correction method for a motor-operated injection molding machine which is designed so that a movable member is moved toward a stationary member so as to be brought into contact therewith by the drive control of a servomotor through a link mechanism, and a support joint, a driving joint and an action joint of said link mechanism are arranged on a straight line for positioning such that a predetermined force of pressure goes on acting, comprising steps of:

detecting a load acting on said servomotor when the movement of said servomotor to an assigned position is completed; and modifying a position command for the movement of said servomotor to the assigned position for the next cycle on the basis of the relationship between the value of said detected load and the value of a preset reference load so that said movable means goes on applying the predetermined force of pressure to said stationary member in the next cycle under a stabler mechanical condition than in the preceding cycle.

2. A positioning correction method for a motor-operated injection molding machine according to claim 1, wherein said movable member is a movable platen fitted with a movable mold member, and a set mold clamping force is produced when the support joint, driving joint and action joint of said link mechanism have become arranged on a straight line.

3. A positioning correction method for a motor-operated injection molding machine according to claim 2, wherein said link mechanism is of either a crank or toggle type, and a command position for the servomotor is a position such that the support joint, driving joint and action joint of a crank or toggle of said link mechanism are arranged on a straight line.

4. A positioning correction method for a motor-operated injection molding machine according to claim 1, wherein said movable member is an injection apparatus, and a nozzle touching force is produced when the support joint, driving joint and action joint of said link mechanism have become arranged on a straight line.

5. A positioning correction method for a motor-operated injection molding machine according to claim 4, wherein said link mechanism uses either a crank or toggle, and a command position for said servomotor is a position such that the support joint, driving joint and action joint of the crank or toggle of said link mechanism are arranged on a straight line.

6. A positioning correction method for a motor-operated injection molding machine according to any one of claim 5, wherein the value of the load on said servomotor is the average of the respective values of loads sampled at a plurality of points of time in the same molding cycle.

7. A positioning correction method for a motor-operated injection molding machine according to any one of claim 5, wherein the assigned position for the next cycle is obtained by adding the product of the value of the load acting on said servomotor and a preset coefficient to the value for the assigned position for the preceding cycle if the absolute value of the load acting on said servomotor when the movement of the servomotor to the assigned position is completed is greater than the value of the preset reference load.

8. A positioning correction method for a motor-operated injection molding machine according to claim 7, wherein the value of the load on said servomotor is the average of the respective values of loads sampled at a plurality of points of time in the same molding cycle.

9. A positioning correction method for a motor-operated injection molding machine according to any one of claim 5, wherein the assigned position for the next cycle is obtained by adding or subtracting a preset fixed value to or from the value for the assigned position for the preceding cycle if the absolute value of the load acting on said servomotor when the movement of the servomotor to the assigned position is completed is greater than the value of the preset reference load.

10. A positioning correction method for a motor-operated injection molding machine according to claim 9, wherein the value of the load on said servomotor is the average of the respective values of loads sampled at a plurality of points of time in the same molding cycle.

* * * * *